Aug. 7, 1962 C. DU BOSQUE, JR 3,048,403

INSTRUCTIONAL AMUSEMENT DEVICE

Filed Oct. 12, 1959 3 Sheets-Sheet 1

INVENTOR
CLAYTON DuBOSQUE, JR.

BY Wentworth B. Clapham

ATTORNEY

Aug. 7, 1962 C. DU BOSQUE, JR 3,048,403

INSTRUCTIONAL AMUSEMENT DEVICE

Filed Oct. 12, 1959 3 Sheets-Sheet 2

INVENTOR

CLAYTON DuBOSQUE, JR.

BY [signature]

ATTORNEY

Aug. 7, 1962 C. DU BOSQUE, JR 3,048,403

INSTRUCTIONAL AMUSEMENT DEVICE

Filed Oct. 12, 1959 3 Sheets-Sheet 3

INVENTOR

CLAYTON DuBOSQUE, JR.

BY Wentworth & Clapham

ATTORNEY 3,048,403
INSTRUCTIONAL AMUSEMENT DEVICE
Clayton Du Bosque, Jr., Canoe Hill Road,
New Canaan, Conn.
Filed Oct. 12, 1959, Ser. No. 845,723
6 Claims. (Cl. 273—130)

This invention relates to an instructional amusement device and more particularly to a novel device for indicating the correct play and for playing positionel games of skill such as Tic-Tac-Toe and "Nim," and others:

Tic-Tac-Toe and "Nim" and similar positional games of skill are usually played by two or more opponents who make marks or shift pieces on a playing surface or field with the object of obtaining a "win" or averting a loss in accordance with the rules of the particular game.

The present devices made in accordance with the invention are designed to "play" such games against an individual player thereby acting as a substitute for the usual opponent. In addition the invention is an educational device for indicating the best play to be made under any given condition of the playing field. Furthermore, the playing field of the device can be used by two or more opponents to play the game of Tic-Tac-Toe or Nim without reference to the preferred plays or moves indicated by the devices.

Many complicated and complex electronic or relay actuated computing machines have been devised for "playing" such games as Tic-Tac-Toe or Nim. Standard electronic computers have also been programmed for this purpose. All such solutions have been both bulky and expensive.

An object of this invention is to provide a low-cost device which will compute and indicate all the correct moves for such games, so that a player may make the moves indicated by the device alternately with moves of his own choice, and thereby obtain a "win" or avert a "loss."

A further object of the invention is to provide a novel device by means of which two or more opponents can play positional games of skill, such as Tic-Tac-Toe or Nim without the use of writing materials, markers, counters or other objects or pieces normally required for such games.

A further object is to provide a novel device for instructing players in the preferred moves or plays to be made in the situations encountered in playing positional games of skill, such as Tic-Tac-Toe or Nim.

With these and other objects not specifically mentioned in view, the invention consists in certain combinations and constructions which will be hereafter fully described, and then set forth in the claims hereunto appended.

In the accompanying drawings which form a part of this specification, and in which like characters of reference indicate the same or like parts:

FIGURES 8–16 inclusive are plan views of a plurality of typical slides used in the device shown in FIGURES 1–6 inclusive.

Figure 17:
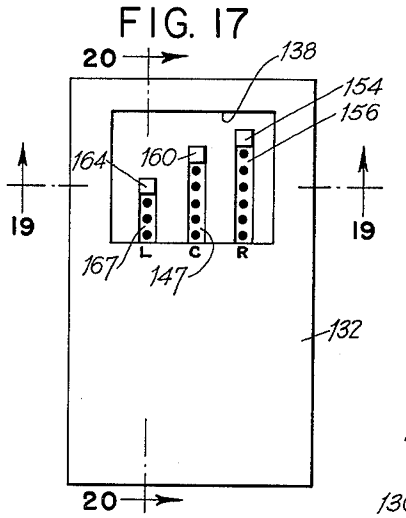

FIGURE 17 is a front elevational view of another device embodying the invention.

Figure 18:
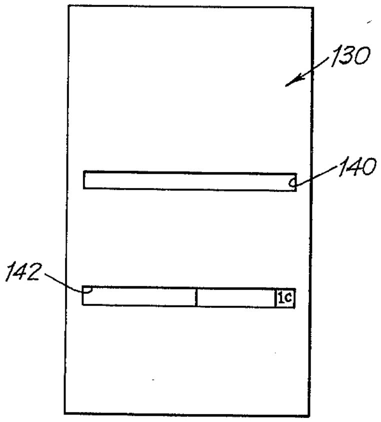

FIGURE 18 is a rear view of the device shown in FIGURE 17.

Figure 19:
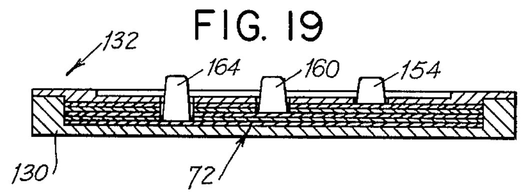

FIGURE 19 is a cross-sectional view taken on line 19—19 in FIGURE 17.

Figure 20:
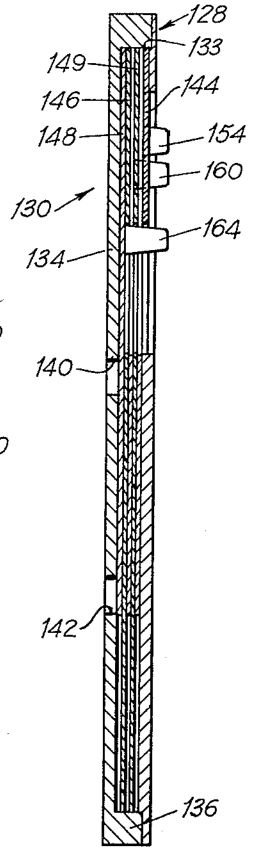

FIGURE 20 is a cross-sectional view taken on line 20—20 in FIGURE 17.

Figure 21:
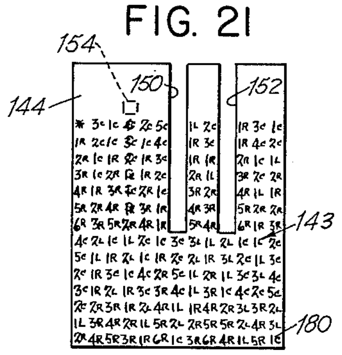
Figure 22:
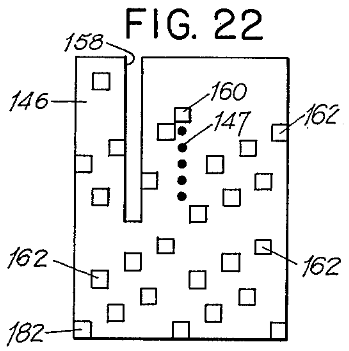
Figure 23:
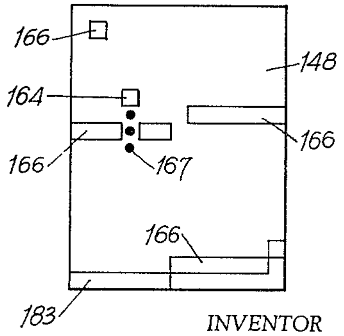
Figure 24:
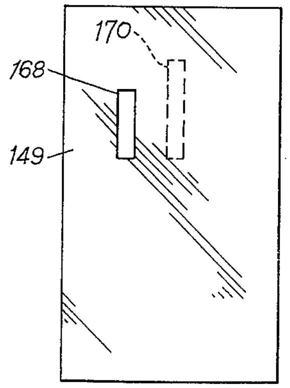

FIGURES 21, 22 and 23 are plan views of a plurality of typical slides used in the device shown in FIGURE 17, and FIGURE 24 is a plan view of suitable separating elements located between selected slides.

Referring to the drawings, FIGURES 1–16 inclusive, disclose a preferred embodiment of the invention in the form of a device for playing the game of Tic-Tac-Toe. As disclosed in FIGURES 1–6, there is provided a housing 11, which preferably is formed from a back 4 and a cover 15. Cover 15 is provided with an integral wall 8 extending along and projecting outwardly at right angles with the plane of the cover. Back 4 is formed with a recess or groove extending along the edges thereof, into which fit the wall 8 for compact assembly.

Back 4 and cover 15 are suitably secured together in assembled relationship by an adhesive. They may also, if desired, be held together in operative relationship by clips, screws, rivets or other suitable holding means.

Figure 2:
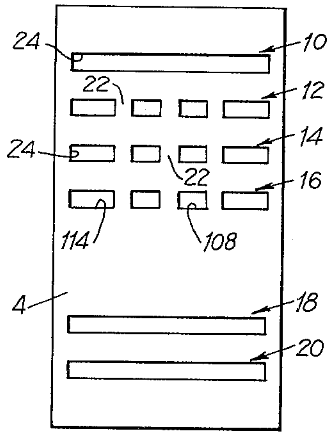
FIGURE 2 is an elevational view of the back of the device shown in FIGURE 1.
Figure 3:
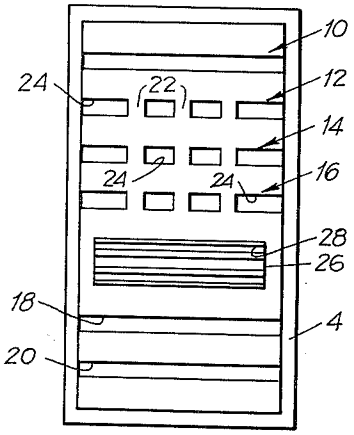
FIGURE 3 is an elevational view of the inside of the back cover.
Figure 4:
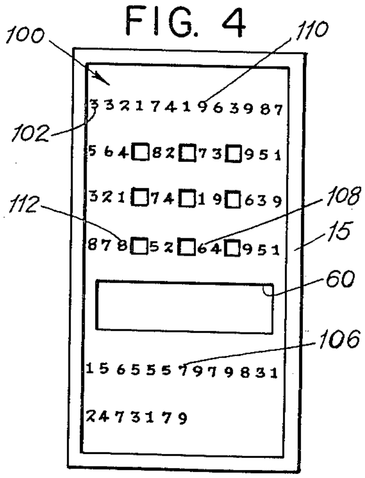
FIGURE 4 is a view of the inner face of the cover.

Referring to FIGURES 2 and 4, it will be noted that back 4 is provided with six (6) sets of parallel slots or openings—10, 12, 14, 16, 18, and 20. These openings preferably are closed as by a sheet of suitable thin transparent plastic, such as cellulose acetate, affixed to the inner face of back 4. It will be readily apparent that separate strips of the selected thin transparent material also could be used. Slots 12, 14, and 16 are provided with opaque or opaqued portions 22. These portions 22 form four spaced windows 24 of suitable width, which allow selected instructive indicia to be visible in playing the game of Tic-Tac-Toe, as will be made clear hereinafter.

Figure 1:
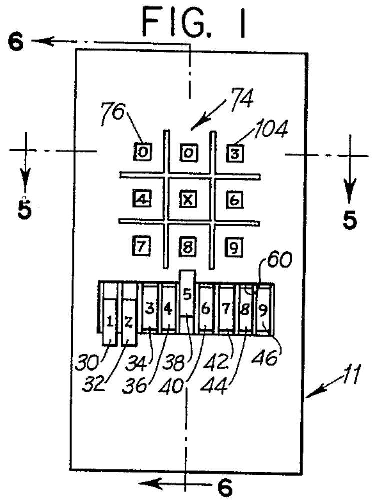
FIGURE 1 is a front elevational veiw of a preferred form of a device embodying the invention.

Attached to, or formed integrally with, back 4, is a slide lock member 26 having grooves 28 in which are seated locking teeth or lugs 29 on the slide manipulating elements or knobs 30–46, one of which is attached to each of the playing slide members of device 2. These elements, as shown in FIGURE 1, correspond to the nine positions in the game of Tic-Tac-Toe, which reading from left to right are numbered 1–9.

Figure 6:
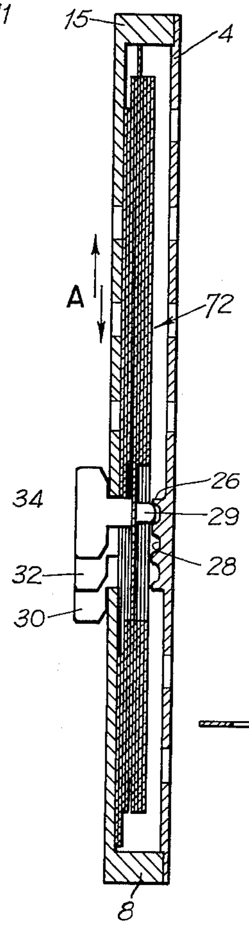
FIGURE 6 is a sectional view taken on line 6—6 in FIGURE 1.

Slide lock member 26 has three parallel corrugations or grooves 28 (FIGURE 6). These insure that the locking lug 29, on a selected slide or slide member, when seated in one of the grooves will be held in either a neutral position, or "no-play," or a position designating a zero or an X, depending upon the character X or zero being used by a player in playing a particular game.

In the game device illustrated in FIGURES 1–16 there are nine slides or slide members 50–58. Each of the slide manipulating elements or knobs 30–46 is attached to a respective slide member. For example, element 30 is attached to slide member 50, and so on. Thus, means are provided for insuring the positive manual displacement of each slide member 50–58 to a selected "play" position in the direction of arrows A or in opposite directions along the longitudinal axis of the device, as viewed in FIGURE 6.

Figure 5:
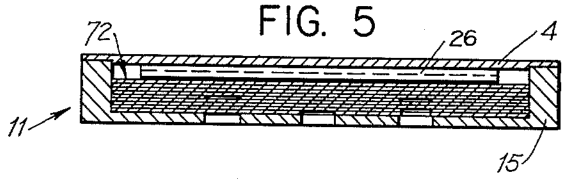
FIGURE 5 is a sectional view taken on line 5—5 in FIGURE 1.
Figure 7:
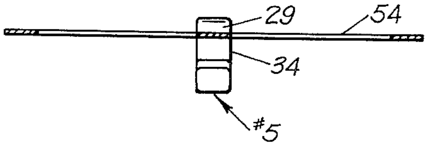
FIGURE 7 is a cross-sectional view of slide number 5 taken on its transverse axis.
Figure 8:
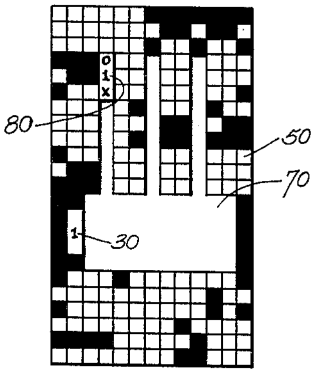
Figure 9:
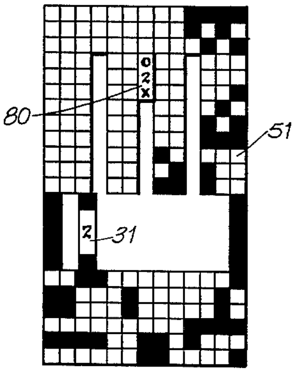
Figure 10:
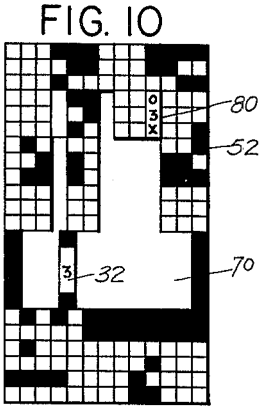
Figure 11:
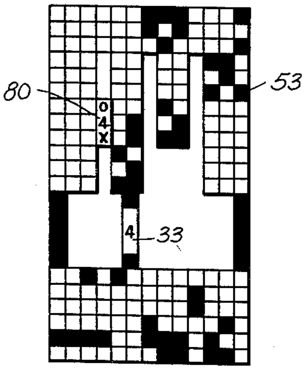
Figure 12:
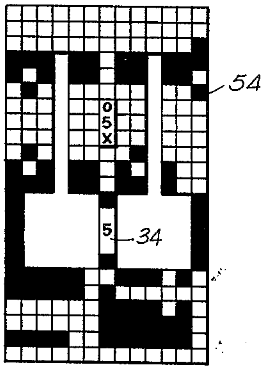
Figure 13:
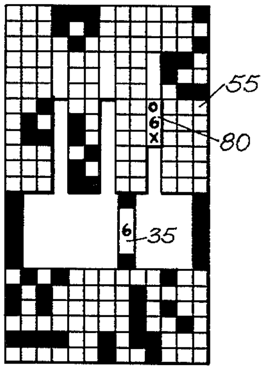
Figure 14:
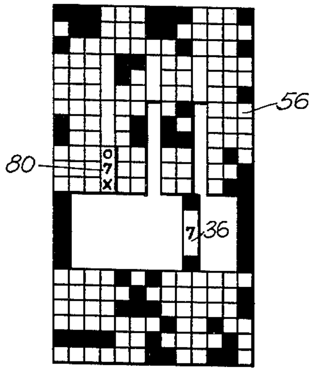
Figure 15:
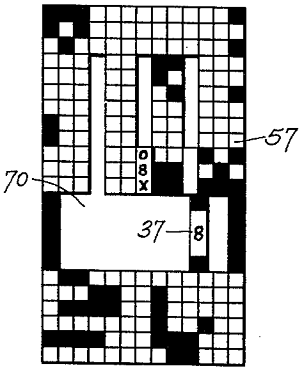
Figure 16:
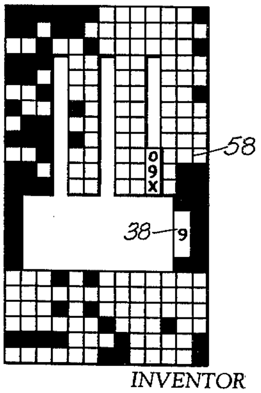

FIGURES 5 and 6 illustrate in cross section, the manner in which the several slide members are assembled in operative relationship. As indicated above in the form illustrated, there are nine slides numbered consecutively 50–58. See FIGURES 8 to 16 inclusive. FIGURE 7, which is a cross-sectional view of slide member 54 taken on its transverse axis with its operating element 34 and its locking lug 29, arranged for assembly in housing 11 shown in FIGURES 5 and 6.

Slide members 50–58 are of such size and shape that they can be assembled in superimposed relationship, as shown in FIGURES 5 and 6, with their respective actuating elements 30–46 extending through transverse slot 60 in cover 15. Elements 30–46 are so constructed and arranged with respect to each other and their respective slides, that they are positioned in side by side spaced relationship in such manner that each element can be gripped manually and shifted longitudinally relative to cover 15 in order to position the slide to which it is attached in the desired selected position of play.

Slide members 50–58 preferably are thin, and preferably are formed from a suitable material, such as a plastic having a low coefficient of friction, thereby enabling each slide to be moved easily relative to those adjacent thereto. So also because the slides are thin, the assembled unit is quite compact and easy to handle. In the form of invention illustrated, slides 50–58 are made of transparent plastic sheet, such as cellulose acetate. Any other suitable plastic or material may be used as long as it can meet the requirements of the invention.

Referring to FIGURES 8–16, it will be seen that slide members 50–58 are rectangular in shape. Each slide member is the same in size and is provided with at least one center opening 70, so spaced that each slide member 50–58 can be moved to its position of play without obstruction. It should also be noted that each slide member is provided with certain data or indicia 80. These data (determine the position each slide member 50–58 is to occupy in the stacked assembly, designated generally 72, FIGURE 5, and also) provide the play information for a given position in the window it represents in the nine square or position of the game of Tic-Tac-Toe. As shown in FIGURE 1, cover 15 is provided with nine windows designated generally 74. Slide member 50 carries the indicia which appears in the window numbered 76. Thus, by shifting slide member 50 in housing 11, up or down as viewed in FIGURE 1, there will appear in window 76, an "X" or a zero, dependent on the symbol selected by a particular player. Each other slide member 51–58 is formed similarly and is provided with operating indicia, although it is located in different positions in order to conform with the indicia requirements of the other windows in cover 15.

It will be noted that certain portions of slide members are opaqued and other portions are cut out or remain transparent. This construction is provided in order to insure that each set of indicia on each slide member, when the latter has been shifted to its selected "play" position, will be visible through its window in cover 15. The arrangement of transparent and opaque squares, and cut-out portions in slide member 50–58, other than central openings 70, as shown, is fairly optional. It is only necessary that they be so arranged that when a slide member is shifted, certain "play" indicia can be seen through a window in cover 15.

The device as described can be used by two players to play Tic-Tac-Toe, through alternately making their moves by raising or depressing knobs 30–46. However, it can also be used to "play" against a single opponent because of the provision of a suitable coding technique. To accomplish this, the rows 10, 12, 14, 16, 18 and 20 provide apertures through which a plurality of play instruction numbers designated generally 100 imprinted on the inner surface 13 of cover 15, can be viewed. There is one number for each "play instruction" that might arise in a normal game. Each slide is masked or left clear in certain areas for each combination of slide positions. The preferred play instruction number will be visible through the superimposed clear areas of the slides. This number, then, will indicate, for that particular position or pattern of the playing board, the square in which the next move of the device, hereinafter referred to as the "machine," should be made.

A typical set of patterns for the nine slides employed in the form of the invention selected for purposes of illustration is shown in FIGURES 8–16. These slides when properly superimposed over the play instruction number pattern on inner face 5 of cover 15 (see FIGURE 3) cooperate as described herein to designate the preferred next play as selected slides are shifted to the "X" or "0" position in the course of playing the game.

Thus, a single player can play a complete game against the device by alternately;

(1) Making his play and
(2) Turning the device over to see the "machine's" choice of play.

It is, of course, necessary for the player to make the play called for.

Actually, in even such a simple game as Tic-Tac-Toe, there are a great many possible playing combinations which can occur in the course of play. To provide each such combination by a play instruction, and corresponding masked or clear areas on each slide would require far more space than is feasible for a practicable and conveniently portable device.

Accordingly a simplified approach has been devised. All conceivable plays are divided into three categories:

(1) Immediate wins—those which will complete a row of three aligned identical characters and so win the game.
(2) Defensive—those which are necessary to stop the opponent from completing a row of three aligned characters on his next move, and thereby winning.
(3) Strategic—all other moves.

There are a maximum of twenty-four (24) each of categories (1) and (2), consisting of three possible combinations in each vertical, horizontal, or diagonal row (8 rows in all).

There is a very great number of strategic moves, but by analysis of all lines of play, I have reduced these to a total of twenty-eight (28), in which practically every play combination does multiple duty in covering a plurality of situations and indicating, if not always the best move, at least a safe move, provided, of course, that no move in the first two categories above is called for.

The "immediate wins" and "immediate defense" moves can also be simplified to a total of twenty (20) moves, or less, in each category, by eliminating certain positions that cannot occur with the specific strategic choices set up.

Because of this simplification, it is possible that several play instruction numbers may be visible at the same time. For example, if the "machine" had two "X"s in a row, and the opponent, rather than "block" this row by inserting a zero in the last position, set up two zeros in a row of his own, both an "immediate win" (category 1) and a "defensive move" (category 2) will show in the play instruction apertures. Obviously the move that will win should be taken.

To assure this choice, the play instruction numbers are arranged in order, say from top to bottom, and left to right by category, with immediate wins first, defensive moves next and strategic moves last. The instructions of the game require that the player scan the windows in the name order, taking the first play instruction number visible. In the device shown, for example, play instruction numbers for immediate wins are located in slots 10 and 12. Defensive moves are indicated in openings 14 and 16, and strategic moves are shown in slots 18 and 20. The required order of selection is from top to bottom, as outlined in FIGURES 2, 3, 4 and 6.

In order to illustrate more clearly the manner in which the slides and body of the subject device operate to indicate the best course of play under any condition or setting of the playing field, consider the play sequence of a typical game in which a person, referred to as the "player," plays a game against the "machine."

At the start all nine slides 50–58 are in the center position. On the front side of the device, the symbols "X" and "0" do not appear in any of the nine windows of the playing field. On the rear, the number "3" referenced as 102 in FIGURE 4, will be visible at the extreme left portion of slot 10 as viewed in FIGURE 3. This indicates the first "machine" choice of move. Assume that the player elects to let the "machine" start, he looks at the rear surface, sees the play indicated, turns to the front surface, and enters the machine's first move by pushing knob 34, which carries the number "3," corresponding to the indicated play instruction. This action shifts slide 52 so that the symbol "X" on knob 42 will now be positioned under window 104, and be visible in the playing field as shown in FIGURE 1. The player now makes his move by pressing downward any of the remaining unmoved knobs. Assume that he elects to take the center square by depressing knob 38, connected to slide 54. With slide 52 in upward position, slide 54 in downward position, and all the rest centered, the number "7," 106 in FIGURE 4 will be revealed through superimposed transparent sections of slide 52 and 54 and be visible through slot 18 in the rear surface. All other play indicating numbers will be covered by the opaque area of one or more slides.

The player, having discovered the number "7" visible, thereupon enters this move on behalf of the machine by pressing knob 42, connected to slide 56 upward. Assume next that the player selects one of the side squares, "4," by pressing knob 36 downward, carrying with it slide 53. He then scans the rear of the machine and notes in opening 108 in slot row 16, FIGURE 4, the number "6." This particular move selection becomes visible only when slides 53 and 54 are in player position, or downward, provided also that slide 55 is in center position, indicating that neither player or machine has taken that square. This move indication is an example of a "defensive" play, since, if the machine did not pick square "6," the player could do so, thereby establishing a straight row of his own symbol, zero, along squares "4," "5," and "6," and hence winning the game.

After the player enters the machine move "6," in manner previously described, assume that the next takes square "2" by depressing knob 32 and slide 51. This, as can be seen, is a poor play, since it leaves open a possible machine win at square "9." Upon scanning the machine move windows, the player will see the number "9," designated 110 in FIGURE 4, visible in slot 10, FIGURE 3, and upon making this move for the machine, he will have been beaten. During this last scanning to find the machine play instruction, the player could also have seen the number "8," designated 112 in FIGURE 4, visible in opening 114 in row 16. This number would be present as a "defensive" selection against the player-occupied squares "2" and "5." Following the rules of operation with this device, as previously set forth, however, the player accepted the machine selection of square "9," since this appeared higher on the board and hence had greater priority.

The above sequence of plays is but one of thousands that can be played. Many of them will lead to draws, or tie games, as should this one, had the player selected square "9" instead of square "2" in his last move. The above sequence illustrates, however, the various types of machine selection—win, defensive, and strategic, and the manner in which one is picked over the other when two or more selections are visible at one time.

FIGURES 17–24, inclusive, show a modified form of the invention embodied in a device to play a different game, usually referred to as "Nim." As disclosed in FIGURES 17–20, there is provided a housing designated generally 128, comprising a body 130 and a cover 132. Body 130 is formed with a back 134 and sides 136 extending at right angles to the plane of back 134. In the preferred embodiment cover 132 is formed with a recess or groove 133 extending along the edge thereof into which fit sides 136 of body 130. Body 130 and cover 132 are secured together in assembled relationship as by a suitable adhesive. They may also, if desired, be held together in operative relationship by clips, screws, rivets or other known means.

Referring to FIGURE 17, and 18, it will be noted that the cover 132 is provided with an opening 138, and that body 130 is provided with two elongated slots 140 and 142. Transparent sections in the back of body 130 also could be used, if so desired. The purpose of opening 138 and slots 140 and 142 will be made clear hereinafter.

Contained in the housing formed by body 130 and cover 132 are three superimposed movable slides 144, 146 and 148, shown in FIGURES 21–23, and two fixed transparent sheets 149 and 151, shown in FIGURE 24. FIGURE 21 is a rear view of slide 144, which contains thereon play instructions symbols or indicia, generally designated as 143. Slide 144 has two slots 150 and 152 and an actuating element or knob 154, which projects from the front surface. Slide 144 also contains on its rear surface, as shown in FIGURE 17, six symbols, such as black circles, designated generally as 156, arranged in a vertical row. In FIGURE 17 symbols 156 are located on the opposite face of slide 144 and therefore do not appear. They are, however, shown in FIGURE 17.

Referring to FIGURE 22, it will be noted that slide 146 contains on its front face, as shown, five symbols, such as black circles 147, arranged in a vertical row. In addition, slide 146 contains a slot 158, an actuating element or knob 160, and a plurality of selectively located square openings or transparent sections generally designated as 162.

Slide 148, as shown in FIGURE 23 contains an actuating element of knob 164, and a plurality of selectively located slotted and/or square openings or transparent sections generally designated as 166, and three symbols, such as black circles, 167, in a vertical row. Separating sheets 149 and 151, preferably formed from a transparent plastic, such as cellulose acetate, are disclosed in FIGURE 24, stacked one over the other for purposes of clarity. Sheets 149, uppermost in FIGURE 24, contains a single slot 168. Sheet 150, beneath, contains two slots, 168 and 170.

The various parts described above are assembled in the order shown in FIGURES 19 and 20, which is, in order, case 130, slide 148, sheet 149, slide 146, sheet 151, slide 144, and cover 132. When so assembled, knob 164 on slide 148 will project through slots 168 of sheet 149, through slot 158 in slide 146, through slot 168 in sheet 151, through slot 152 in slide 144, and through opening 138 in cover 132.

In like manner, knob 160 projects through slot 170 in sheet 151, through slot 150 of slide 144, and through opening 138 of cover 132, and, finally, knob 154 on slide 144 projects through opening 138.

Each slide is shorter than the inner vertical dimension of body 130, so that each slide may be moved vertically by means of its associated knobs. The sheets 149 and 151 function as separators and prevent contact or sticking between adjacent slides and thereby prevent the movement of one slide from affecting the position of or causing movement in another.

The game of "Nim" normally is played with any desired number of objects or counters, or the equivalent, arranged in a plurality of rows. Two players alternate turns, each manually removing one or more counters or objects, in his turn, from one row only. A win is obtained by the player who succeeds in removing the last counter.

The game board described above, and pictured in FIGURES 17–24, can be used by two players to play "Nim" against each other. To start, slides 144, 146 and 148 are shifted upwardly to a predetermined start or agreed position, so as to display a number of symbols, i.e. colored circles, 167, 147 and 156 representing counters, in each row. The maximum number in this particular embodiment is 3, 5 and 6 symbols in respective rows, as shown in FIGURE 17. The slides may, however, be started as positions which will display fewer number of symbols within the confines of opening 138.

To play the game, players alternate depressing a selected knob on one of the slides a selected distance, so that the slide is moved downward, thereby causing one or more of the symbols printed on that slide to disappear from view in opening 138. This action simulates the picking up of counters in the more usual mode of play. When all knobs are depressed fully, all symbols will have been removed from view, and the game will be over, the last player to make a legitimate play being the winner.

The device described above can also be used to play against a single player through provision of a coding technique similar to that used in the previously described Tic-Tac-Toe device. To accomplish this, the slots 140 and 142 on body 130, the openings 162 on slide 146, the openings 166 on slide 148 and the play instruction symbols 143 on slide 144 are disposed in such fashion that for each possible combination of slide positions one, and only one play instruction symbol will be visible from the rear of the device.

For example, referring to FIGURE 18, which is a rear view of the device with the slides set as shown in FIGURE 17, the play instruction symbol "1C" will be noted at the right end of slot 142. This symbol is shown as symbol 180 on slide 144 in FIGURE 21, and it is visible through the juxtapositions of square opening 182 in slide 146, slot opening 183 in slide 148, and slot 142 on body 130. Sheets 149 and 151, being transparent, do not interfere with the visibility of the symbol. The visible symbol "1C" means remove one "counter" from the center on "*c*" slide, i.e. slide 146 as marked on the cover 132, FIGURE 17.

In like manner, each of the play instruction symbols on slide 144 will be revealed by a unique combination of slide positions. In all cases the play indicator symbols represent either the best play for each situation represented by the slide positions or, if several equal choices are available, one of the best plays. Thus, the player can alternate turns with the device, selecting his own moves as he desired, but making the moves called for, on behalf of the device, in each situation, as indicated by the play instruction symbol, visible on the rear of the housing. Since this process is similar to that described in detail in the form of the invention adapted to play the game of Tic-Tac-Toe, it will not be necessary to follow through a game of Nim in play by play fashion.

As will be apparent, a number of other games of positional or counter form, or the like, can be adapted to this invention by altering the arrangement of slides, play indicia, openings or windows, play instruction symbols, and the other optional features contributing to ease or convenience of use.

These two preferred embodiments are pictured and described merely to illustrate the general scope and application of the invention. No limitation is intended on the variety of games that can be played on modifications of the basic invention.

I claim:

1. An instructional game device comprising a housing having a front face and a rear face, said front face having a plurality of windows disposed in a predetermined play arrangement, a plurality of individually movable members contained in said housing, each of said members having a plurality of selective indicia viewable only through a selected window and at least one opening through which play instruction indicia may be viewed, means for moving selected members progressively selected distances within said housing relative to other members in making plays to expose selected indicia on said movable members in windows corresponding to the position of said movable members, play instruction viewing windows also formed in said housing, instructional indicia defining play information carried within said housing, whereby after each play specific instructional indicia are exposed through overlying openings in said members and one of said last-named windows providing information instructing the player of a member to be moved in making the next preferred play.

2. In a game playing device in combination, a housing having front and back faces, said front face being provided with a plurality of viewing zones arranged to define a playing field and instructional play indicia on the inner surface of said front face, a plurality of selectively movable slide members mounted in said housing, indicia on one side of each of said slides adapted to be viewed through one of said viewing zones, said back face also being provided with indicia viewing openings through which selected play instruction indicia can be viewed in response to a movement of a selected slide, instructional transparent indicia viewing zones formed in said slides, and means for selectively moving said slides in progression in accordance with a predetermined plan of movement, whereby for a given position of said slides corresponding to a specific playing field status only the indicia showing a preferred next move will be displayed through matched viewing zones in said slides and said viewing openings in said housing.

3. In a game playing device, in combination, a housing having front and back faces, said front face being provided with a plurality of viewing windows arranged to define a playing field, said back face being provided with instructional viewing windows, a plurality of slides selectively movably mounted in said housing, said slides being provided with indicia on one side thereof whereby in accordance with the relative positions of said slides the status of moves of the game being played is displayed in said viewing windows in said front face, one of said slides having instructional indicia on its other side, and the other slides having transparent sections, said transparent sections in each slide being so constructed and arranged that for each selected arrangement of the positions of the slides specific transparent sections become matched and thereby display specific instructional indicia through one of said instructional viewing windows.

4. An instructional amusement device for game playing comprising a housing provided with a plurality of windows disposed in the form of a playing field, and a plurality of viewing windows through which instructional indicia for playing the game may be seen, said housing also carrying instructional indicia therewithin, a plurality of superimposed movable slide members contained within said housing, each of said members being provided with indicia representing playing pieces, and said slide members being constructed with transparent zones so arranged that for each normal combination of slide positions in which a specific arrangement of said indicia representing said playing pieces is displayed on said field specific instruction indicia can be seen through one of said viewing windows and through overlying transparent zones in said slide members, and means for moving each slide progressively to a selected position of play.

5. In an instructional game device, a housing having a front face, a plurality of openings formed in said face arranged in positions forming a playing field for the game, a plurality of movable members, each bearing at least one character and at least one transparent zone, means mounting each of said members for movement in said housing, means for selectively moving said character bearing members relative to each other and to said openings, whereby in response to the movements of said members the status of moves on said playing field is displayed, and wherein the inner surface of said front face carries indicia instructing a player as to the next best play to be made after each member is moved to an operational position, and said rear face is provided with openings through which such information is viewable through matched transparent zones in said members.

6. An instructional game device comprising a housing having a front face and a rear face, said front face having a plurality of windows disposed in a predetermined play arrangement, a plurality of individually movable members having a plurality of selective indicia viewable only through a selected window, means for moving selected members progressively selected distances within said housing relative to the other members to expose selected indicia on said movable member in windows corresponding to the position of said movable members, said rear face of said housing having a plurality of openings, and the inner surface of said front cover being provided with indicia defining play information, whereby after each play indicia are exposed through openings in said rear face providing information instructing the player of a member to be moved in making the next preferred play, each of said members comprising a slide having selectively located transparent sections, and including means mounting each of said slides in superimposed arrangement for selective independent movement relative to each other, whereby in response to a selected movement of a slide member said transparent sections are so disposed that information of a preferred next slide to be moved is made known to a player.

References Cited in the file of this patent

UNITED STATES PATENTS

| | | |
|---|---|---|
| 1,130,332 | Pittenger | Mar. 2, 1915 |
| 1,360,726 | Crook | Nov. 30, 1920 |
| 2,221,303 | Shipley | Nov. 12, 1940 |